UNITED STATES PATENT OFFICE.

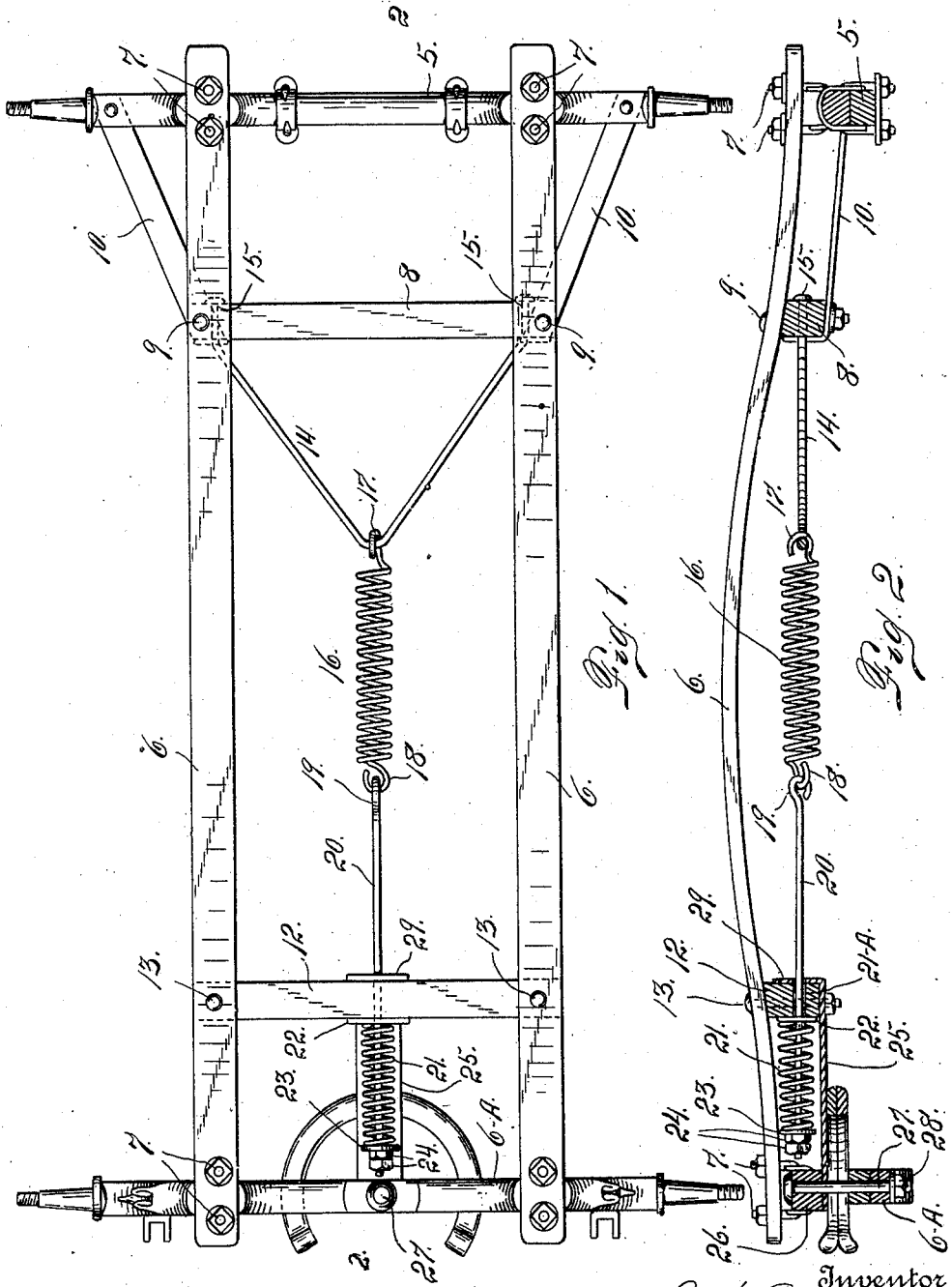

NELS J. ANDERSON, OF DENVER, COLORADO.

SPRING-GEAR FOR VEHICLES.

972,145.  Specification of Letters Patent.  Patented Oct. 11, 1910.

Application filed July 16, 1909. Serial No. 507,984.

*To all whom it may concern:*

Be it known that I, NELS J. ANDERSON, citizen of the United States, residing in the city and county of Denver and State of Colorado, have invented certain new and useful Improvements in Spring-Gears for Vehicles; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in spring gears for vehicles, my object being to provide an attachment of this class which shall make it practicable to construct the longitudinally disposed side-bars of wood instead of steel and having the structure sufficiently strong for the purpose. To this end I introduce a yielding device centrally located between the side-bars of the vehicle and adapted to be placed under sufficient tension to properly support the side bars in their upwardly bowed position. This spring member has a tendency to yieldingly resist downward pressure upon the side-bars, and is of sufficient strength to satisfactorily perform the required function.

Having briefly outlined my construction, I will proceed to describe the same in detail, reference being made to the accompanying drawing, in which is illustrated an embodiment thereof.

In this drawing: Figure 1 is a top plan view of the vehicle gear equipped with my improvements. Fig. 2 is a section taken on the line 2—2, Fig. 1.

The same reference characters indicate the same parts in all the views.

Let the numeral 5 designate the rear axle and 6^A the front axle of the vehicle. These axles are connected by separated, parallel, longitudinally disposed, upwardly bowed side-bars 6, which may be composed of wood, their opposite extremities being connected with the respective axles by U-bolts 7. The side-bars 6, are connected near their rear extremities by a crossbar 8, by means of bolts 9. The extremities of the bars 8, are also connected with the rear axle by means of metal braces 10. The bars 6, are further connected near their forward extremities by a crossbar 12, the extremities of the crossbar being connected with the side-bars by bolts 13.

A V-shaped rod 14, has its free extremities anchored in the outer extremities of the crossbar 8, as shown at 15. The apex of this rod is located forwardly of the crossbar 8, and is connected with the rear extremity of a coil spring 16, the latter being provided with a hook 17, for the purpose. The forward extremity of the spring 16 is provided with a hook 18, which is connected with the eye 19, of a forwardly extending rod 20, which passes through an opening 21^a, formed in the center of the crossbar 12. The rod 20, extends forward of the crossbar 12, and its forward portion is surrounded by a coil spring 21, one extremity of which engages a washer plate 22, applied to the crossbar 12, while its opposite extremity engages a washer 23, applied to the forward extremity of the rod 20 and held in place by securing nuts 24. The crossbar 12, is further supported in place by means of a plate 25, whose forward extremity is connected with bolster 26, by the king bolt 27, which also passes through the forward axle 6^A and is held in place by a fastening nut 28. The rear extremity of the plate 25, is connected with the bar 12, by an upwardly turning flange 29, engaging the bar in the rear and having an opening registering with the opening 21^a, to receive the rod 20.

The tension of the spring 21, as well as that of the spring 16, may be regulated by adjusting the nuts 24. It will be understood that as pressure is applied to the bars 6, having a tendency to straighten the bars or press downwardly their upwardly bowed central portions, this tendency will be resisted by the tension of the springs 16 and 21. If desired, the spring 16, may be omitted, in which event the rod 20, would be connected directly with the V-shaped rod 14.

Having thus described my invention what I claim is:

1. In spring gears for vehicles, the combination with the front and rear axles of longitudinally disposed, separated side-bars connecting the axles, a rearwardly located cross bar connected with the side bars, a centrally located rod, having its rear extremity connected with the said cross bar, and a second named crossbar connecting the said side bars near their forward extremities, a plate connecting the second named cross bar with the forward axle, the plate and cross bar having registering openings to receive the said rod, the forward extremity of the rod having a tension nut, and a coil spring interposed between the tension nut and the cross bar, substantially as described.

2. The combination with the forward and rear axles of a vehicle, of longitudinally disposed separated, side bars connecting the axles a rearwardly located cross bar, a V-shaped rod whose extremities are anchored in the said cross bar, said rod extending forwardly from its anchorage, a spiral spring connected at one extremity with the apex of the V-shaped rod, a centrally located rod connected with the opposite extremity of the spring, a cross bar connecting the side bars near the forward extremities and having an opening through which the central rod passes, a coil spring surrounding the center rod forward of the cross bar, and a tension nut applied to the forward extremity of the center rod for the purpose set forth.

In testimony whereof I affix my signature in presence of two witnesses.

NELS J. ANDERSON.

Witnesses:
MARGARET F. MAURY,
JESSIE HOBART.